July 26, 1960
R. W. SIEBERS
2,946,872
SHOCK AND VIBRATION RESISTANT
ELECTROMAGNETIC CONTACTOR
Filed Dec. 19, 1957
3 Sheets-Sheet 1
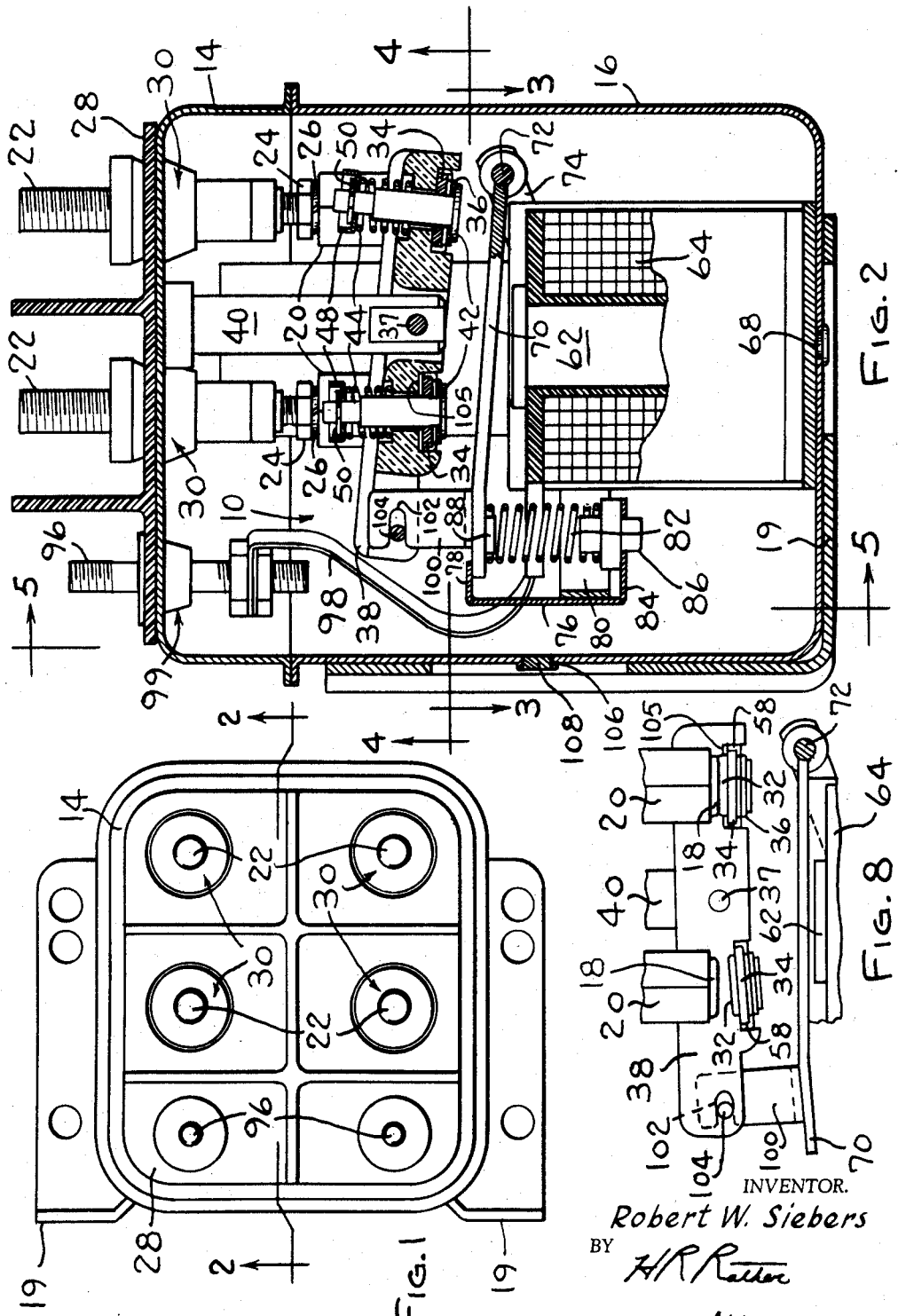
INVENTOR.
Robert W. Siebers
BY
H. R. Ratter
Attorney

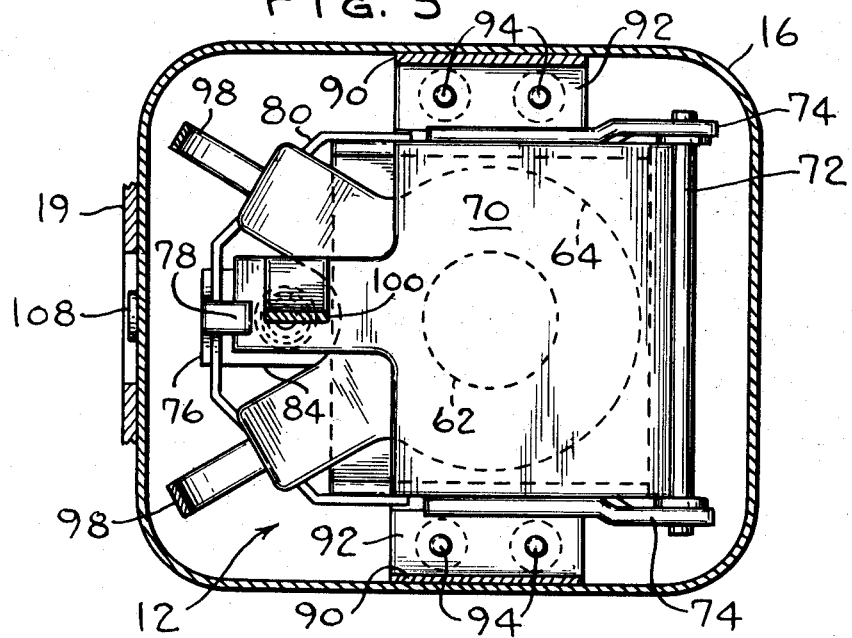
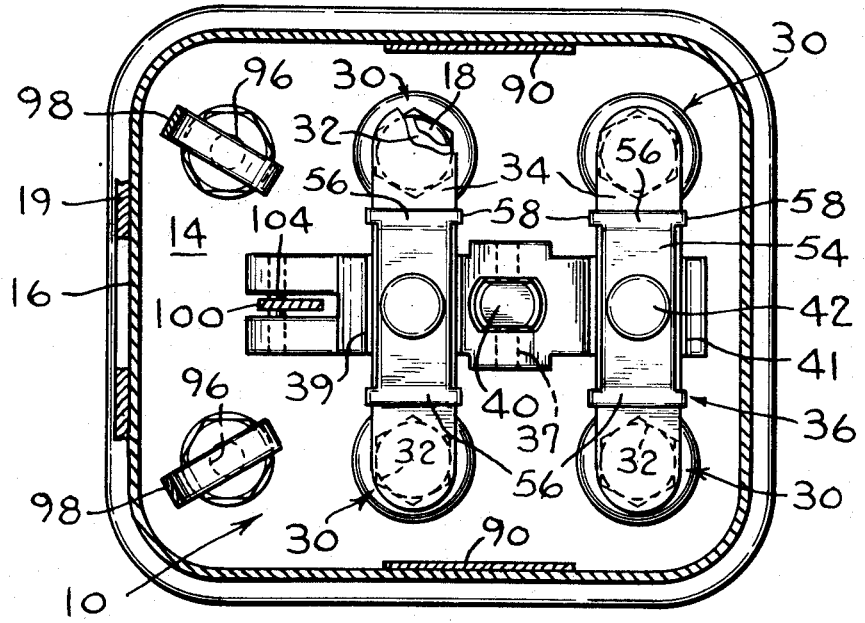

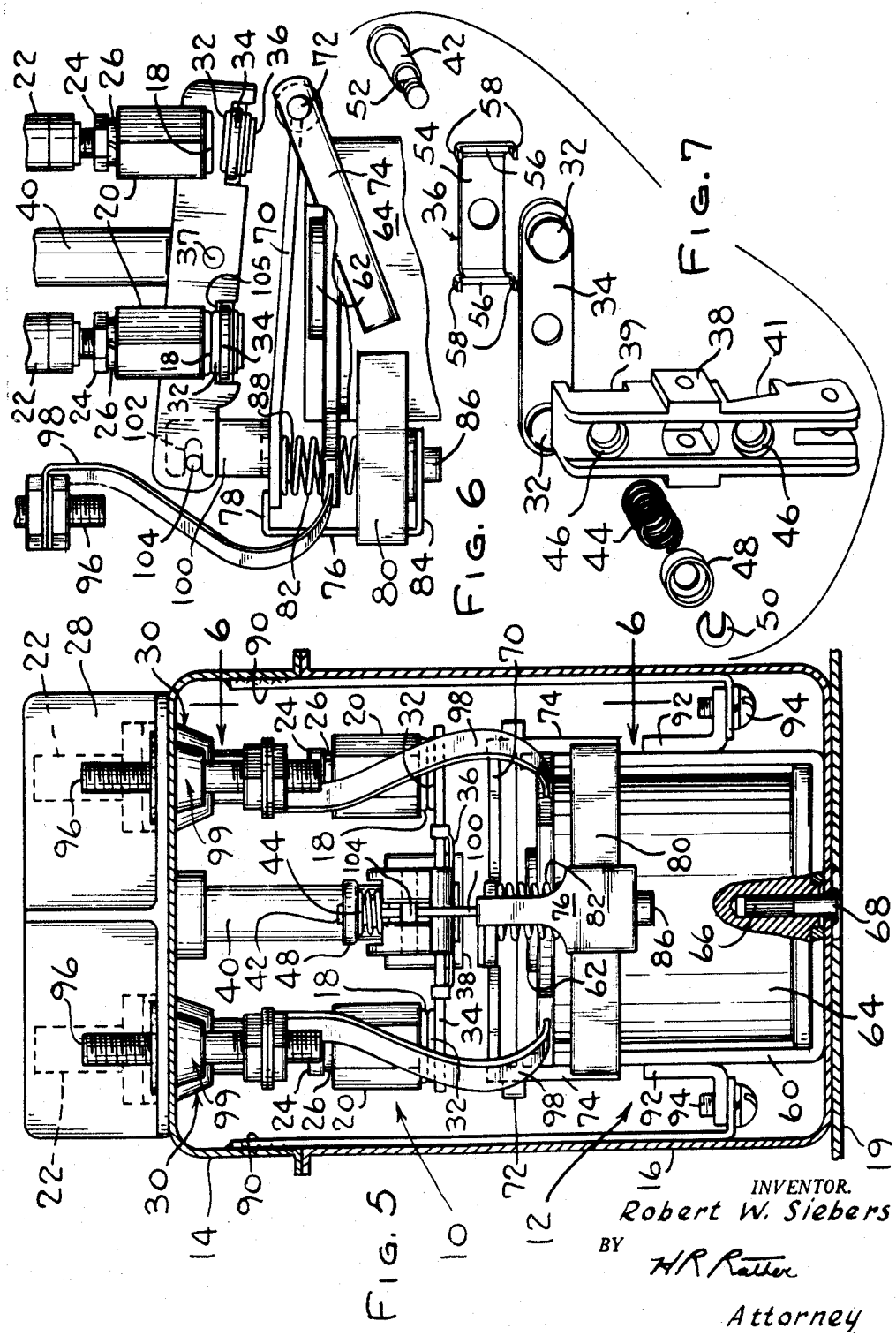

United States Patent Office 2,946,872
Patented July 26, 1960

2,946,872
SHOCK AND VIBRATION RESISTANT ELECTROMAGNETIC CONTACTOR

Robert W. Siebers, Milwaukee, Wis., assignor to Cutler-Hammer, Inc., Milwaukee, Wis., a corporation of Delaware Filed Dec. 19, 1957, Ser. No. 703,837

14 Claims. (Cl. 200—87)

This invention relates to electric control devices suitable for use as contactors or relays.

It is an object of this invention to provide a high performance electric control device having improved shock and vibration characteristics.

Another object is to provide an electric control device in which the operating mechanism can be easily adjusted and tested and then readily enclosed and hermetically sealed.

Improved shock and vibration characteristics are attained by mounting a bridging contactor on a lever pivoted at or near its center of gravity for rocking movement with a pair of stationary contacts. A stiffening means is provided for such bridging contactor to further reduce vibration.

A pair of bridging contactors may be mounted on either side of the lever pivot point for cooperation with two pairs of stationary contacts. In this arrangement a parallel relationship at the touch point of the mating contacts is attained by cocking the bridging contactors slightly with respect to each other. A further refinement is provided by mounting the normally closed bridging contactor closer to the lever pivot point than the normally open bridging contactor to obtain the necessary contact force at the normally closed contacts to further improve performance under shock and vibration conditions.

The operating mechanism of the device including the stationary contacts, bridging contactor assembly, and electromagnetic actuator may be completely subassembled with such mechanism supported from and electrically connected through a cover member to facilitate adjustment and testing prior to enclosure and hermetic sealing of the device in a suitable shell.

Other objects and advantages will be apparent from the detailed description that follows taken together with the drawings, in which:

Fig. 1 is a top plan view of an electric control device embodying the present invention;

Fig. 2 is a vertical sectional view taken on line 2—2 of Fig. 1;

Fig. 3 is a horizontal sectional view taken on line 3—3 of Fig. 2;

Fig. 4 is a horizontal sectional view taken on line 4—4 of Fig. 2 with parts of one bridging contactor broken away;

Fig. 5 is a vertical sectional view taken on line 5—5 of Fig. 2;

Fig. 6 is a fragmentary sectional view taken on line 6—6 of Fig. 5 with part of the magnet frame broken away;

Fig. 7 is an exploded view of the lever and one bridging contactor assembly; and Fig. 8 is a fragmentary view similar to Fig. 6 but with the magnet energized.

The device shown in the drawings and described hereinafter is for many applications wherein a hermetically sealed device with high standards of shock and vibration resistance are specified. The two-pole switch designated generally by numeral 10 is designed to handle 25 amps at the normally closed contacts and 50 amps at the normally open contacts at 28 volts D.C. or 115 volts A.C., respectively. Variations in the rating and number of poles of the switch may be made within the scope of this invention. The induction coil of the electromagnetic actuator 12 is designed for 28 volt D.C. operation. The subassembled switch mechanism 10 and the electromagnetic actuator 12 are supported from and electrically connected through a cover 14 for final adjustment and testing prior to hermetic sealing of the device in a shell 16. A mounting bracket 19 is secured to the shell for mounting the device to a panel in the position shown in Figs. 2 and 5.

Switch mechanism 10 includes two spaced pairs of downwardly facing stationary contacts 18 adjustably supported by contact nuts 20 threaded on the ends of terminals 22 extending vertically through cover 14. Nuts 24 and lock washers 26 are provided to lock stationary contact nuts 20 in adjusted position. Terminals 22 are hermetically sealed in cover 14 by any suitable means and are connected at their upper ends to the external circuits to be controlled by suitable nuts and lock washers (not shown). A terminal barrier 28 is provided to prevent accidental shortcircuiting of adjacent terminals. The details of sealing means 30 shown generally in Figs. 2 and 5 are shown and described in copending application Serial No. 403,124, filed January 11, 1954, and will, therefore, not be described in detail herein.

Upwardly facing movable contacts 32 on bridging contactors 34 (of aluminum or other suitable material) are supported beneath stationary contacts 18 by a lever 38. The lever is pivotally mounted at or near its center of gravity by a pin 37 supported at the end of a post 40 depending from cover 14 between the spaced pairs of stationary contact terminals 22. All contacts are of silver composition mounted on contact nuts 20 and bridging contactors 34 in a standard manner.

With the bridging contactors mounted on lever 38 on either side of pin 37 located at or near the center of gravity of the lever, the gravitational force system acting on the lever and bridging contactor assembly is substantially balanced resulting in improved shock and vibration characteristics particularly at the normally closed contacts. Electromagnetic actuator 12 imparts a rocking movement to lever 38 (through a linkage mechanism described hereinafter) to cause bridging contactors 34 to alternately make and break contact with the corresponding pairs of stationary contacts 18 to thereby control a pair of external circuits connected across the right and left hand pairs of terminals 22, as viewed in Fig. 1.

As clearly shown in Fig. 7, bridging contactors 34 are resiliently mounted in notches 39 and 41 in the bottom face of lever 38 to provide wear allowance at the contacts. The assembly includes headed pins 42 extending up through stiffener clips 36, bridging contactors 34 and lever 38 with compression springs 44 mounted on such pins between countersunk portions 46 in the top of lever 38 and cap washers 48 held by notched lock washers 50 seated in grooves 52 at the ends of pins 42. Shims (not shown) may be mounted between cap washers 48 and springs 44 to adjust the spring load prior to assembly of lever 38 on post 40.

Pivoted lever 38 is preferably of a ceramic material which in high temperature operation has advantages over a molded plastic part. The ceramic lever will not give off corrosive gases at high temperatures as will a molded plastic part causing deterioration of the part itself as well as contamination of other switch parts, particularly the switch contacts.

To strengthen the aluminum bridging contactors 34 without making them unduly heavy a spring clip 36, preferably of stainless steel, is mounted on the bottom of each contactor by pins 42, as shown in Fig. 7. The body portion 54 of each clip is spaced from the bottom of the contactor by offset end portions 56 which bear against the contactor at spaced points remote from the center thereof. Ears 58 on offset ends 56 engage the edges of the contactor to prevent turning of the clips on pins 42. The force exerted by the clips on the contactors is concentrated at spaced points close to movable contacts 32 carried thereby to further improve the vibration characteristics of the switch.

It will be noted (Figs. 6 and 8) that the normally closed contacts are mounted on lever 38 at a shorter distance from pivot 37 than are the normally open contacts. This is done to compensate for the difference in the force exerted on lever 38 by electromagnetic actuator 12 in the energized position (Fig. 8) and by the armature return spring in the deenergized position (Fig. 6), the maximum return spring force being limited by the size of the electromagnetic actuator. By shortening the moment arm with which the return spring acts on the normally closed contacts, the force at the normally open contacts is increased resulting in improved vibration characteristics at the normally closed contacts in the deenergized position.

As shown in Figs. 6 and 8, the normally closed and normally open contacts, respectively, are positioned parallel to each other at the contact touch point for the optimum mating of the contacts to thereby reduce friction at pin 42 and prolong contact life. This parallel relationship is accomplished by cocking the bridging contactors (along the longitudinal axes thereof) so that the contact surfaces of movable contacts 32 will face away from each other at a slight angle. In the preferred embodiment, the mounting faces of grooves 39 and 41 in lever 38 are formed at a slight angle with each other to effect the cocked relationship of the movable contacts. It should be understood, however, that other means such as sloping one surface of one or both of the bridging contactors or one or both of the pairs of movable contacts would produce the desired result and be within the scope of this invention.

The electromagnetic actuator 12 for actuating switch mechanism 10 includes a U-shaped magnet frame 60 with a core 62 and an induction coil 64 mounted on the base of the frame by a splined pin 66. End portion 68 of pin 66 projects slightly from the bottom of the frame for aligning and anchoring the unit in shell 16 as will presently be described. An armature 70 is pivotally mounted on frame 60 by pin 72 supported in arms 74 fastened to the sides of the frame. The stroke of armature 70 is controlled by a stop member 76 having a horizontal tab 78 for engagement with the end of the armature. Stop member 76 is supported by a bracket 80 fastened by welding or other suitable means to the sides of frame 60. The proper stroke adjustment can be made prior to mounting actuator 12 on cover 14 by bending tab 78 to the proper position. An armature return spring 82 is mounted between the end of armature 70 and a lower leg 84 of stop member 76. The return spring is held in place by a spring gland 86 mounted in leg 84 and a bushing 88 formed on the bottom of the armature.

As shown in Fig. 5, actuator 12 is supported from cover 14 by strips 90 fastened to opposite depending sides of the cover by welding or other suitable means and to frame 60 by support brackets 92 and machine screws 94. Coil 64 is energized from terminals 96 extending through cover 14 and connected to the coil by conductor strips 98. Terminals 96 are hermetically sealed in cover 14 by a sealing means 99 shown generally in Figs. 2 and 5, the details of which are shown and described in the aforementioned application Serial No. 403,124. Strips 90 are preferably of non-magnetic material such as stainless steel so as not to disrupt and/or weaken the magnetic lines of force set up upon energization of the electromagnetic actuator.

Switch mechanism 10 is actuated by a link 100 fastened to the top of the armature 70 and having a notch 102 for engagement with a pin 104 mounted at the end of lever 38. With the switch mechanism and electromagnetic actuator thus supported from cover 14, the subassembled unit is ready for final adjustment and testing. The proper contact wear allowance is obtained by first adjusting the normally closed contact nuts 20 with the coil deenergized (Fig. 6) and then adjusting the normally open contact nuts 20 with the coil energized (Fig. 8). Adjustment is made by rotating contact nuts 20 on threaded terminals 22 and measuring the space 105 (Figs. 6 and 8) between the top surface of the bridging contactors and the mounting face of notches 39 and 41 in lever 38 by a suitable feeler gauge. Contact nuts 20 are then locked in adjusted position by means of nuts 24 and lock washers 26 on the terminals. Finally, the proper pickup voltage is obtained by adjusting the force of return spring 82 by installing washers (not shown) as necessary between spring gland 86 and the lower end of the return spring.

After final adjustment and testing, the subassembled unit is inserted in shell 16 with the end 68 of splined pin 66 aligned with an opening in the bottom of the shell. The entire unit is then hermetically sealed by welding pin 66 to the shell and welding the cover to the shell at the mating flanges between the two parts. The interior of the housing can be evacuated or filled with a suitable gas or liquid by means of an opening 106 in the side of the shell which is then sealed by welding a plug 108 in the opening. The cover, shell, pin and plug are preferably of stainless steel with all welds made by inert gas arc welding.

Although but one embodiment of the present invention has been illustrated and described, it will be apparent to those skilled in the art that various changes and modifications may be made therein without departing from the spirit of the invention or from the scope of the appended claims.

I claim:

1. An electromagnetically operated switch comprising, a shell member having an opening at one end thereof, a support member mounted in said opening, a pair of terminal posts mounted in said support member and extending into said shell, a pair of stationary contacts mounted on the ends of said terminals facing into said shell, a lever pivotally mounted in said shell and supported from said support member, said lever positioned substantially parallel to said support member, a bridging contactor mounted on said lever having a pair of movable contacts mounted thereon opposite said stationary contacts for movement in and out of contact with said stationary contacts as said lever is pivoted, and an electromagnetic actuator supported from said support member and operatively connected to said lever to actuate said lever.

2. A switch according to claim 1 in which said stationary contacts are adjustable axially of said terminals to move said stationary contacts toward and away from said movable contacts.

3. A switch according to claim 1 in which said electromagnetic actuator is supported from said support member opposite thereof and between said lever and the closed end of said shell.

4. A switch according to claim 3 in which said electromagnetic actuator is supported from said support member by a pair of non-magnetic strips fastened to opposite sides of said electromagnetic actuator.

5. A switch according to claim 1 in which there are a second pair of terminals mounted in said support member from which said magnetic actuator is energized.

6. An electromagnetically operated switch comprising, a shell member having an opening at one end thereof, a support member mounted in said opening, two pairs of terminal posts mounted in said support member and extending into said shell, a stationary contact mounted on the end of each of said terminal posts, a lever pivotally mounted in said shell and supported from said support member, a pair of bridging contactors mounted on said lever on opposite sides of the pivot point of said lever, a pair of movable contacts mounted on each of said bridging contactors for movement in and out of contact with said stationary contacts as said lever is pivoted, and an electromagnetic actuator supported from said support member and operatively connected to said lever to impart a rocking movement to said lever.

7. A switch according to claim 6 in which said lever is substantially balanced on its pivotal mounting in said shell.

8. An electric control device comprising, support means, stationary contacts mounted on said support means, a substantially balanced lever pivotally mounted on said support means, a normally closed and a normally open bridging contactor mounted on said lever on opposite sides of the pivot point of said lever, a pair of movable contacts mounted on each of said bridging contactors for movement in and out of contact with said stationary contacts as said lever is pivoted, said movable contacts on one of said bridging contactors being cocked slightly with respect to the contacts on the other bridging contactor so that said contacts face away from each other at a slight angle to provide a parallel relationship at the touch point of the movable and stationary contacts, and means operatively connected to said lever to impart a rocking movement to said lever.

9. An electric control device comprising, support means, stationary contacts mounted on said support means, a substantially balanced lever pivotally mounted on said support means, a normally closed and a normally open bridging contactor mounted on said lever on opposite sides of the pivot point of said lever, said normally closed bridging contactor mounted a shorter distance from the pivot point of said lever than is said normally open bridging contactor, a pair of movable contacts mounted on each of said bridging contactors for movement in and out of contact with said stationary contacts as said lever is pivoted, and means operatively connected to said lever to impart a rocking movement to said lever.

10. An electric control device comprising, support means, stationary contacts mounted on said support means, a substantially balanced lever pivotally mounted on said support means, a normally closed and a normally open bridging contactor mounted on said lever on opposite sides of the pivot point of said lever, a spring clip fastened along one side of each bridging contactor having offset end portions to space the clip from the contactor and thereby concentrate the support force exerted by said clip to points near the ends of said bridging contactors, a pair of movable contacts mounted on each of said bridging contactors for movement in and out of contact with said stationary contacts as said lever is pivoted, and means operatively connected to said lever to impart a rocking movement to said lever.

11. An electric control device comprising, support means, stationary contacts mounted on said support means, a substantially balanced lever pivotally mounted on said support means, a normally closed and a normally open bridging contactor mounted on said lever on opposite sides of the pivot point of said lever, a pair of movable contacts mounted on each of said bridging contactors for movement in and out of contact with said stationary contacts as said lever is pivoted, means operatively connected to said lever to impart a rocking movement to said lever, said support means including a cover member from which said stationary contacts, lever and actuating means are independently supported.

12. An electrical control device comprising, support means, stationary contacts mounted on said support means, a lever pivotally mounted on said support means, a bridging contactor for said stationary contacts, stiffening means for said bridging contactor including a support spring clip fastened along one side of said bridging contactor, the ends of said support spring clip being offset toward said bridging contactor to space said clip from said bridging contactor and thereby concentrate the support force exerted by said clip to points near the ends of said bridging contactor, and means operatively connected to said lever to artuate said lever.

13. An electric control device comprising, support means, stationary contacts mounted on said support means, a lever pivotally mounted on said support means, a bridging contactor of aluminum for said stationary contacts, stiffening means for said bridging contactor including a support spring clip of stainless steel fastened along one side of said bridging contactor, and means operatively connected to said lever to actuate said lever.

14. An electromagnetically operated switch comprising, a shell member having an opening at one end thereof, a support member mounted in said opening, two pairs of terminal posts mounted in said support member and extending into said shell, a stationary contact mounted on the end of each terminal post, a substantially balanced lever pivotally mounted in said shell and supported from said support member, a normally open and a normally closed bridging contactor mounted on said lever on opposite sides of the pivot point thereof, said normally closed bridging contactor mounted closer to the lever pivot than said normally open bridging contactor, a pair of movable contacts mounted on each of said bridging contactors for movement in and out of contact with said stationary contacts as said lever is pivoted, said contacts on one of said bridging contactors being cocked slightly with respect to the contacts on the other bridging contactor so that said contacts face away from each other at a slight angle, and an electromagnetic actuator supported from said support member and operatively connected to said lever to impart a rocking movement to said lever.

References Cited in the file of this patent

UNITED STATES PATENTS

| | | |
|---|---|---|
| 916,505 | Thullen | Mar. 30, 1909 |
| 1,961,058 | Mace | May 29, 1934 |
| 2,082,493 | Hartman | June 1, 1937 |
| 2,323,113 | Blosser | June 29, 1943 |
| 2,448,772 | Clare et al. | Sept. 7, 1948 |
| 2,564,246 | Bourne | Aug. 14, 1951 |
| 2,727,113 | Mohr et al. | Dec. 13, 1955 |